(12) United States Patent
Ring

(10) Patent No.: US 11,427,264 B1
(45) Date of Patent: Aug. 30, 2022

(54) SIDEWALL-MOUNTED FOLD-OUT TABLE FOR A TRUCK BED

(71) Applicant: Vincent M. Ring, Omaha, NE (US)

(72) Inventor: Vincent M. Ring, Omaha, NE (US)

(*) Notice: Subject to any disclaimer, the term of this patent is extended or adjusted under 35 U.S.C. 154(b) by 288 days.

(21) Appl. No.: 16/902,403

(22) Filed: Jun. 16, 2020

(51) Int. Cl.
B62D 33/027 (2006.01)
B60N 3/00 (2006.01)
B60R 7/08 (2006.01)
E05F 5/10 (2006.01)
B60J 7/14 (2006.01)

(52) U.S. Cl.
CPC .......... B62D 33/027 (2013.01); B60J 7/141 (2013.01); B60N 3/001 (2013.01); B60R 7/08 (2013.01); E05F 5/10 (2013.01); E05Y 2900/516 (2013.01)

(58) Field of Classification Search
CPC ....... B62D 33/023; B62D 33/027; B60J 7/141
USPC ....... 296/100.01, 100.06, 100.08, 13; 108/44
See application file for complete search history.

(56) References Cited

U.S. PATENT DOCUMENTS

| 6,467,417 | B1 | 10/2002 | Guyot et al. | |
| 6,663,160 | B2* | 12/2003 | Yarbrough | B60J 7/141 296/100.1 |
| 7,950,728 | B2 | 5/2011 | Plavetich | |
| 9,481,316 | B2 | 11/2016 | Faruque et al. | |
| 9,540,050 | B2* | 1/2017 | Miller | B60J 7/1621 |
| 9,783,246 | B1* | 10/2017 | Long | B62D 33/027 |
| 10,040,387 | B2 | 8/2018 | Johnston | |
| 10,232,793 | B2* | 3/2019 | Frederick | B60N 3/001 |
| 10,358,170 | B2 | 7/2019 | Khatri et al. | |
| 10,435,082 | B1* | 10/2019 | Kupina | B60P 1/486 |
| 10,500,993 | B2* | 12/2019 | Yacob | B60N 2/3095 |
| 2005/0093339 | A1 | 5/2005 | Klassen | |
| 2010/0308617 | A1* | 12/2010 | Golden | B62D 33/0273 296/39.2 |

* cited by examiner

Primary Examiner — Jason S Morrow
Assistant Examiner — Wenwei Zhuo
(74) Attorney, Agent, or Firm — Nasr Patent Law LLC; Faisal K. Abou-Nasr

(57) ABSTRACT

A fold-out table for a truck bed is disclosed. The fold-out table includes a tabletop configured to extend longitudinally along an inner sidewall of the truck bed. The fold-out table further includes one or more hinges disposed below an upper rim of the inner sidewall of the truck bed. The hinges are configured to couple the tabletop to the inner sidewall of the truck bed so that the tabletop is pivotable between a raised position and a lowered position. The tabletop may be substantially perpendicular to the inner sidewall of the truck bed when the tabletop is in the raised position and substantially parallel to the inner sidewall of the truck bed when the tabletop is in the lowered position.

17 Claims, 4 Drawing Sheets

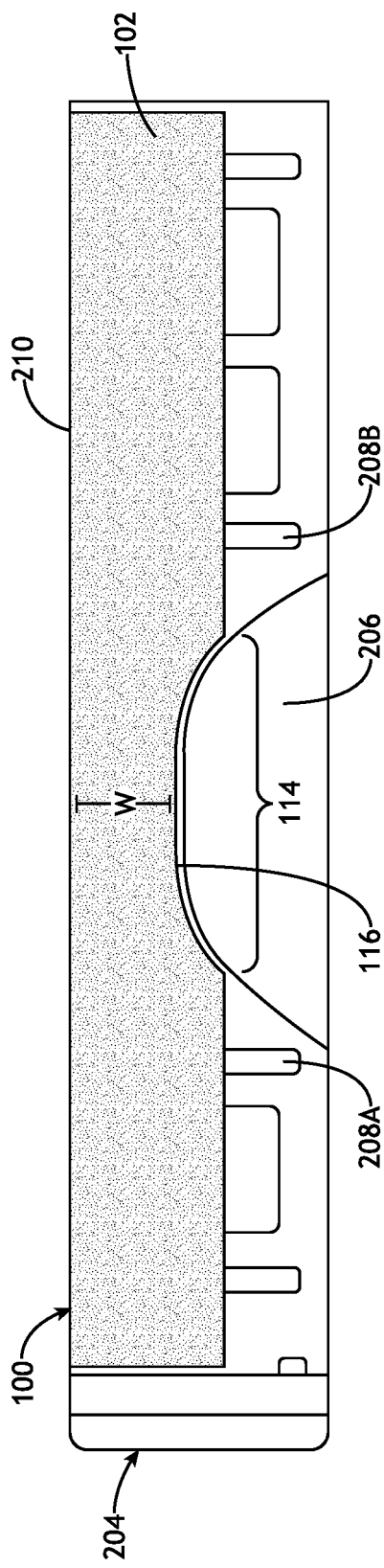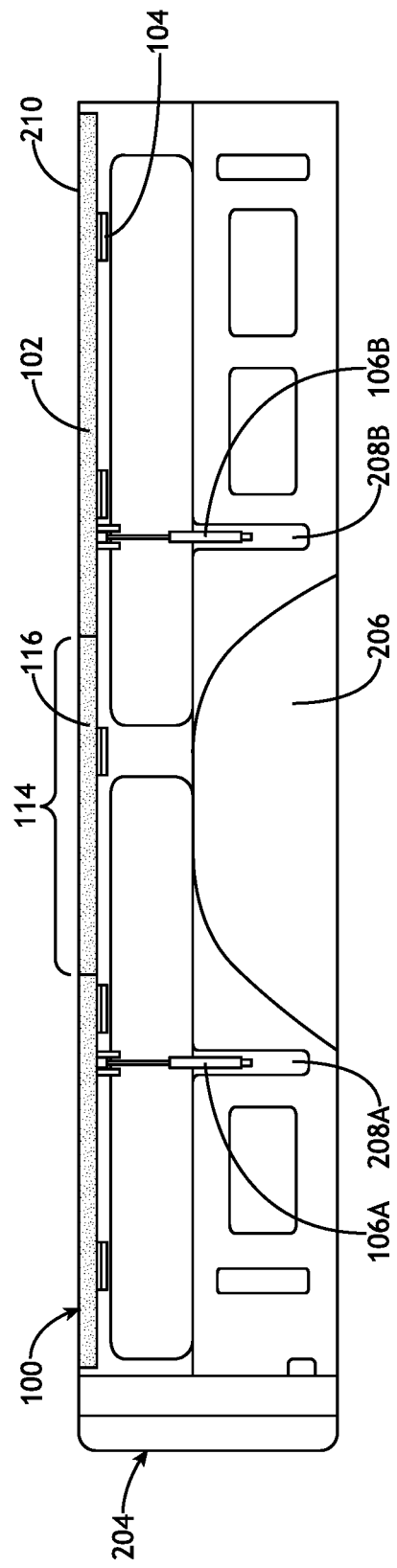
FIG.3A
FIG.3B

SIDEWALL-MOUNTED FOLD-OUT TABLE FOR A TRUCK BED

TECHNICAL FIELD

The present invention generally relates to vehicle structures and, more particularly, to fold-out tables for a truck bed.

BACKGROUND

Pickup trucks can transport large or irregularly shaped item because of their extended and typically open truck beds. This makes trucks a great asset to any household. Consequently, trucks have become among the most popular vehicles in the United States.

Trucks are often used for camping, tailgating, and other outdoor activities. In addition to their transport capabilities, having a tailgate (i.e., a rear board/gate) that folds down and forms a surface to sit on or place items makes trucks incredibly useful for such activities.

Over time, there have been improvements to truck beds in order to make them even more user-friendly. Many improvements are focused on adding features or functionality to the tailgate of a truck bed. Meanwhile, the sidewalls of a truck bed are often neglected despite having greater dimensions than the tailgate.

There is a need for improvements that add functionality to the sidewalls of a truck bed. The present disclosure addresses that need.

SUMMARY

A sidewall-mounted fold-out table for a truck bed is disclosed. The fold-out table includes a tabletop configured to extend longitudinally along an inner sidewall of the truck bed. The fold-out table further includes one or more hinges disposed below an upper rim of the inner sidewall of the truck bed. The hinges are configured to couple the tabletop to the inner sidewall of the truck bed so that the tabletop is pivotable between a raised position and a lowered position. The tabletop may be substantially perpendicular to the inner sidewall of the truck bed when the tabletop is in the raised position and substantially parallel to the inner sidewall of the truck bed when the tabletop is in the lowered position.

In one or more embodiments, the hinges are adjacent to the upper rim of the inner sidewall of the truck bed.

In one or more embodiments, the tabletop is configured to be at least partially stowed beneath the upper rim of the inner sidewall of the truck bed when the tabletop is in the lowered position.

In one or more embodiments, the fold-out table further includes one or more retractable support members configured to hold the tabletop in the raised position when the tabletop is pivoted from the lowered position to the raised position.

In one or more embodiments, at least two retractable support members are coupled to the inner sidewall of the truck bed on opposite sides of a wheel arch.

In one or more embodiments, retractable support members may comprise gas struts or gas springs.

In one or more embodiments, the tabletop includes a cutout configured to surround at least a portion of a wheel arch when the tabletop is in the lowered position.

In one or more embodiments, the tabletop has a non-uniform width along the cutout.

In one or more embodiments, the cutout is complementary to a curvature of the wheel arch.

In one or more embodiments, the fold-out table further includes one or more hooks or hangers configured to hold items suspended from the tabletop when the tabletop is in the raised position.

In one or more embodiments, a fold-out table system for a truck bed may include a plurality of fold-out tables. For example, the fold-out table system may include a first fold-out table configured to extend inwardly from a first sidewall (e.g., right side) of the truck bed and a second fold-out table configured to extend inwardly from a second sidewall (e.g., left side) of the truck bed. In other embodiments, the fold-out table system may include a single fold-out table attached or built into one side (e.g., only the right side or only the left side) of the truck bed, two or more fold-out tables attached or built into one side of the truck bed, or two or more fold-out tables attached or built into each of the right and left sides of the truck bed.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In the drawings:

FIG. 3A is a front view of a sidewall-mounted fold-out table for a truck bed, wherein the table is in a lowered position (i.e., folded down), in accordance with one or more embodiments of the present disclosure;

FIG. 3B is a front view of a sidewall-mounted fold-out table for a truck bed, wherein the table is in a raised position (i.e., folded out), in accordance with one or more embodiments of the present disclosure.

DETAILED DESCRIPTION

Reference will now be made in detail to the subject matter disclosed, which is illustrated in the accompanying drawings. Referring generally to FIGS. 1 through 4, a sidewall-mounted fold-out table for a truck bed is disclosed.

As noted above, there have been improvements to truck beds in order to make them more user-friendly for camping, tailgating, and other outdoor activities. For example, truck beds have been modified to include hidden compartments, ramps, and passenger support structures. Many improvements are focused on adding features or functionality to the tailgate of a truck bed. Meanwhile, the sidewalls of a truck bed are often neglected despite having greater dimensions than the tailgate. This disclosure presents a fold-out table that leverages the dimensions of the sidewalls to provide a long surface that can be used to support a variety of tailgating items (e.g., food, drinks, utensils, plates, etc.) or supplies (e.g., tools, paint, etc.).

Figure 1:
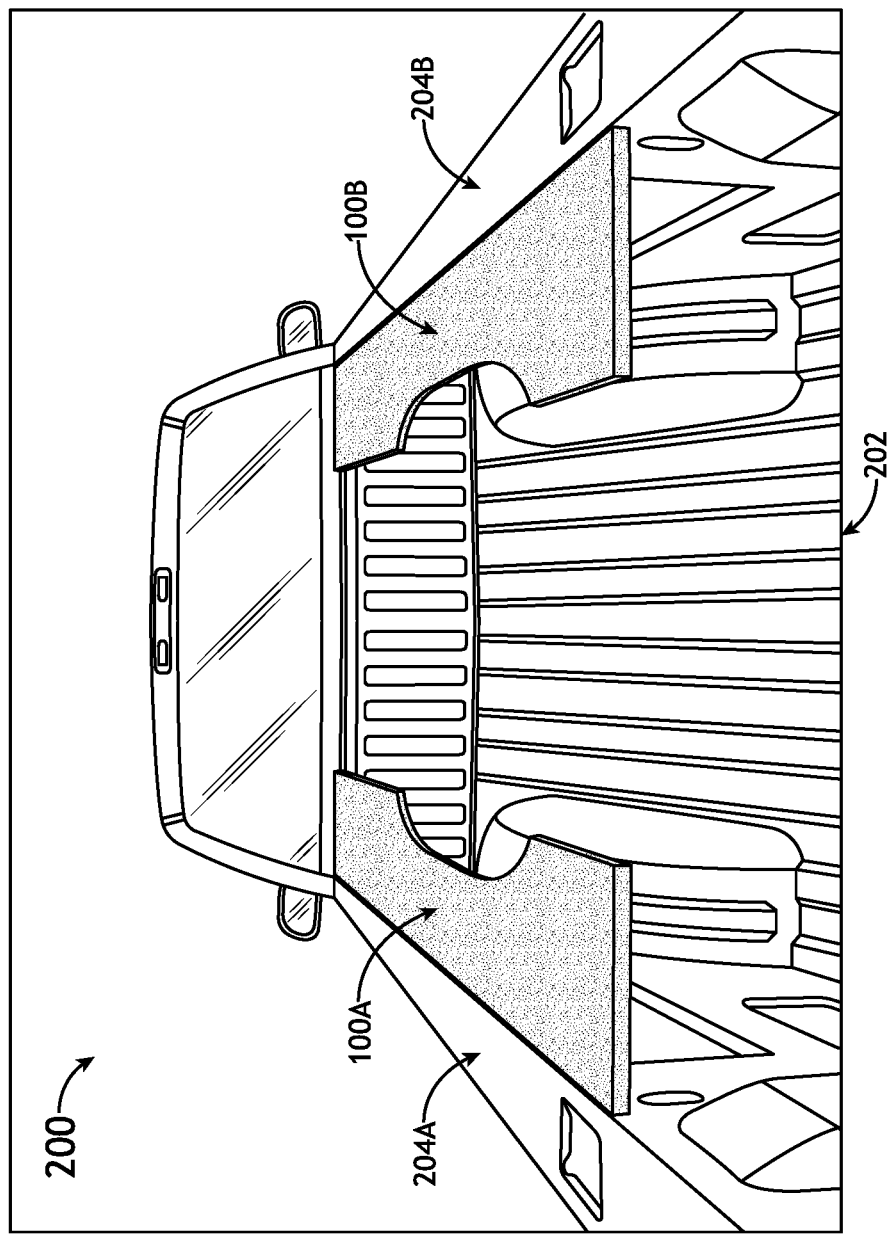
FIG. 1 is a perspective view of a truck bed with sidewall-mounted fold-out tables, in accordance one or more embodiments of the present disclosure.

FIG. 1 illustrates an embodiment of a fold-out table system for a truck 200 (e.g., a pickup truck). The fold-out table system may include one or more sidewall-mounted fold-out tables 100 for a truck bed 202 of the truck 200. For example, FIG. 1 illustrates a fold-out table system that includes a first fold-out table 100A configured to extend inwardly from a first sidewall 204A (e.g., left side) of the truck bed 202 and a second fold-out table 100B configured to extend inwardly from a second sidewall 204B (e.g., right side) of the truck bed 202. In other embodiments, the fold-out table system may include a single fold-out table 100 attached or built into one sidewall 204 (e.g., only the right side or only the left side) of the truck bed 202, two or more fold-out tables 100 attached or built into the same sidewall 204 as one another, or two or more fold-out tables 100 attached or built into each sidewall 204 of the truck bed 202.

Figure 2:
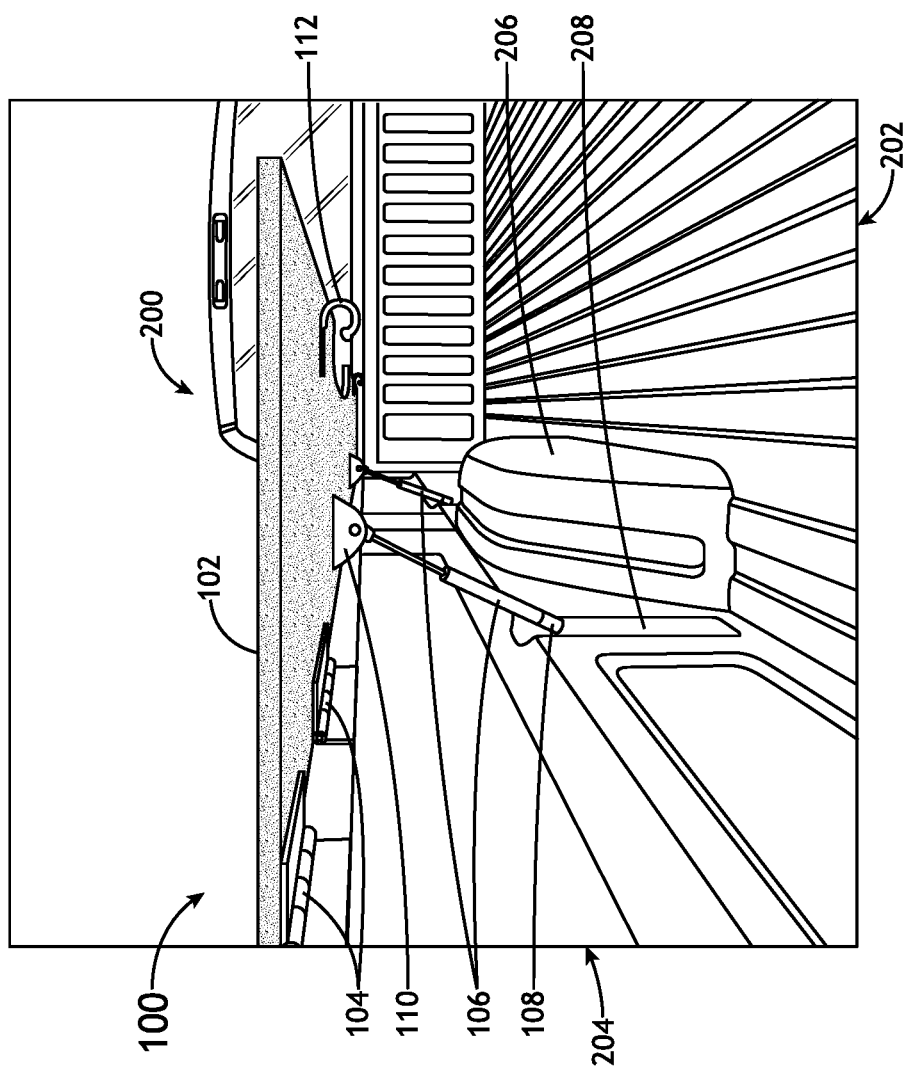
FIG. 2 is a side view of a sidewall-mounted fold-out table for a truck bed, in accordance one or more embodiments of the present disclosure.

As shown in FIG. 2, the fold-out table 100 (or each fold-out table 100A, 100B, etc.) in a fold-out table system includes a tabletop 102 configured to extend longitudinally along an inner sidewall 204 of the truck bed 202. The tabletop 102 may be formed from a durable, anti-corrosive material. For example, the tabletop 102 may be formed from a composite material, a metal/metal alloy, fiberglass, treated wood, or any combination thereof. More specific examples of appropriate materials include, but are not limited to, High-Density Polyethylene (HDPE), Acrylonitrile Butadiene Styrene (ABS), aluminum, and/or an aluminum alloy. In some embodiments, the tabletop 102 may extend along most of the length of the sidewall 204. For example, the length of the tabletop 102 may be in the range of 50% to 99% the length of the sidewall 204, preferably in the range of 70% to 99% the length of the sidewall 204. In other embodiments, the tabletop 102 may be shorter (e.g., less than 50% the length of the sidewall). When shorter tabletops 102 are used, a fold-out table system can include two or more fold-out tables 100 attached or built-into the same sidewall 204 of the truck bed 202. In some embodiments, two or more fold-out tables 100 may have a short distance (e.g., less than one inch) in between one another so that they can be folded out simultaneously to produce a long multi-segment tabletop, wherein the tabletops of the two or more fold-out tables 100 form the segments of the multi-segment tabletop.

The tabletop 102 is coupled to the sidewall 204 by one or more hinges 104 (e.g., piano hinges) disposed below an upper rim 210 of the inner sidewall 204 of the truck bed 202. In embodiments, the tabletop 102 may be coupled to the sidewall 204 by at least two hinges 104 or a plurality (e.g., 3, 4, 5, or more) hinges 104. The hinges 104 are configured to couple the tabletop 102 to the inner sidewall 204 of the truck bed 202 in a manner that allows tabletop 102 to pivot between a raised position and a lowered position.

As shown in FIGS. 3A, the tabletop 102 may be substantially parallel to the inner sidewall 204 of the truck bed 202 when the tabletop 102 is in the lowered position (i.e., when the tabletop 102 is folded down). For example, an angle between the tabletop 102 and the inner sidewall 204 may be in the range of 0 to 10 degrees when the tabletop 102 is in the lowered position. In FIG. 2 or FIG. 3B, it can be seen that the tabletop 102 is substantially perpendicular to the inner sidewall 204 of the truck bed 202 when the tabletop 102 is in the raised position (i.e., when the tabletop 102 is folded out). For example, an angle between the tabletop 102 and the inner sidewall 204 may be in the range of 85 to 95 degrees (preferably 90 degrees) when the tabletop 102 is in the raised position.

In embodiments, the hinges 104 may be located at or directly adjacent to (e.g., within 1 to 2 inches of) the upper rim 210 of the inner sidewall 204 of the truck bed 202. For example, in FIG. 3B, the hinges 104 are right below the upper rim 210 of the inner sidewall 204, such that the tabletop 102 sits flush with the upper rim 210 when the tabletop 102 is in the raised position. In other embodiments, the tabletop 102 may sit above or below the upper rim 210 when the tabletop 102 is in the raised position. In some embodiments, the upper rim 210 may overhang from the inner sidewall 204 of the truck bed 202. In such cases, it may be advantageous for the upper rim 210 to cover the tabletop 102 when the tabletop is in the lowered position. For example, the hinges 104 may be located beneath the upper rim 210 such that the tabletop 102 is configured to be at least partially stowed beneath the upper rim 210 of the inner sidewall 204 of the truck bed 202 when the tabletop 102 is in the lowered position. This can help protect the tabletop 102 from moisture or debris when it is folded down and not in use.

Still referring to FIGS. 2 through 3B, the fold-out table 100 may further include one or more retractable support members 106 configured to hold the tabletop 102 in the raised position when the tabletop 102 is pivoted from the lowered position to the raised position. In some embodiments, the tabletop 102 may be supported in the raised position by at least two retractable support members 106 that are coupled to the inner sidewall 204 of the truck bed 202 on opposite sides of a wheel arch 206. For example, as shown in FIG. 3B, the tabletop 102 may be coupled to a first retractable support member 106A that is behind the wheel arch 206 and may also be coupled to a second retractable support member 106B that is in front of the wheel arch.

Each of the retractable support members 106 may have one end coupled to the tabletop 102 and a second end coupled to the inner sidewall 204. For example, the first retractable support member 106A may have one end coupled to the tabletop 102 and a second end coupled to the inner sidewall 204, and similarly, the second retractable support member 106B may have one end coupled to the tabletop 102 and a second end coupled to the inner sidewall 204. Furthermore, in some embodiments, each of the retractable support members 106 may be disposed within respective indentations 208 that are formed within the inner sidewall 204. For example, the first retractable support member 106A may be disposed within a first indentation 208A located behind the wheel arch, and the second retractable support member 106B may be disposed within a respective indentation 208B located in front of the wheel arch.

In some embodiments, the retractable support members 106 are gas struts or gas springs. For example, in a specific embodiment, the retractable support members 106 may comprise two 10 inch long, 45 pound gas struts for approximately 90 pound load bearing capability. For many light or medium duty applications, 60 to 200 pound load bearing capability will be appropriate. In this regard, the retractable support members 106 may comprise two or more 30 to 100 pound gas struts/springs, or any other type of retractable support member (e.g., a spring-loaded linear actuator, motorized linear actuator, hydraulic linear actuator, electromagnetic linear actuator, or the like). It is noted that other dimensions or load bearing specifications may be appropriate depending on the specifications of the truck 200 and/or user requirement. Accordingly, the specific examples/embodiments in this disclosure should be understood as non-limiting examples unless otherwise provided in the claims.

As shown in FIG. 3A, the tabletop 102 may include a cutout 114 configured to surround at least a portion of the wheel arch 206 when the tabletop 102 is in the lowered position (i.e., when the tabletop 102 is folded down). The tabletop 102 may have a non-uniform width (W) along the cutout 114 portion. For example, the width (W) of the tabletop 102 along the cutout 114 may vary according to the curvature of the wheel arch 206. In some embodiments, the cutout 114 is complementary to the curvature of the wheel arch 206 so that an outer edge 116 of the cutout 114 runs along a contour of the wheel arch 206 when the tabletop 102 is in the lowered position.

Figure 4:
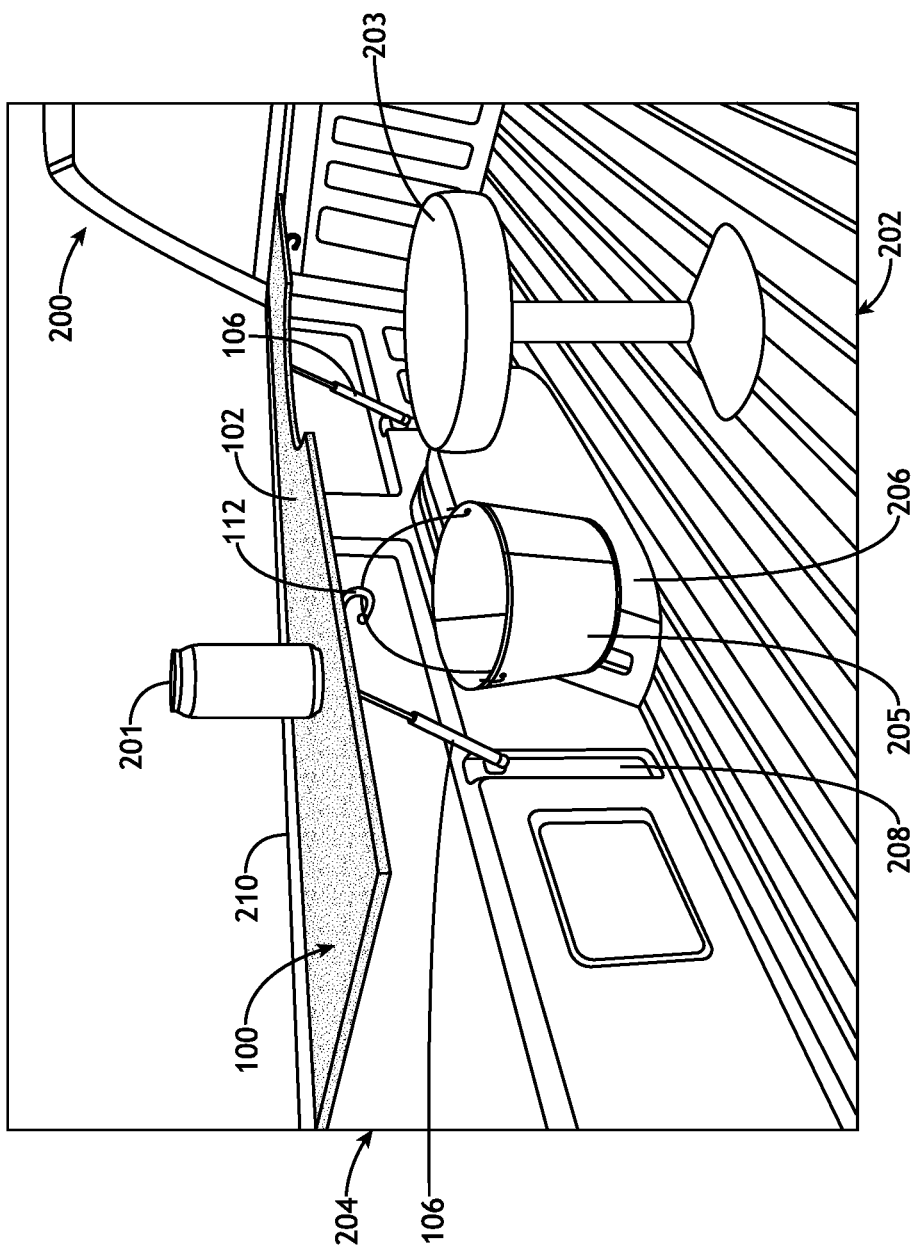
FIG. 4 is a perspective view of a sidewall-mounted fold-out table for a truck bed, in accordance one or more embodiments of the present disclosure.

FIG. 4 illustrates an embodiment of the fold-out table 100 in combination with other objects. When the tabletop 102 is in the raised position (e.g., folded out), one or more items 201 may be placed upon the tabletop 102. In some embodiments, the fold-out table 100 further includes one or more hooks 112 or hangers configured to hold items 205 suspended from the tabletop 102 when the tabletop 102 is in the raised position. For example, hooks/hangers 112 may be attached to a lower surface or edge of the tabletop 102. In some embodiments, the tabletop 102 is high enough off the floor of the truck bed 202 for one or more stools 203, chairs, or benches to be used as seats at the tabletop 102 by persons located on the truck bed 202.

Some specific embodiments of the fold-out table 100 are disclosed below. However, it is noted that various dimensions, number, and configuration of components may be appropriate depending on the specifications of the truck 200 and/or user requirement. Accordingly, the specific examples/embodiments in this disclosure should be understood as non-limiting examples unless otherwise provided in the claims.

In a specific embodiment, the tabletop 102 may be approximately 92.75 inches long and 12 inches wide (except for the cutout portion). The tabletop 102 may include a cutout 114 that is 5.25 inches long and 8.5 inches wide. The tabletop 102 may be supported by two 10 inch, 45 pound gas struts that are 42 inches apart. Two hooks 112 may be coupled to an underside of the tabletop 102 and spaced 58.75 inches apart. Furthermore, the tabletop 102 may be coupled to the inner sidewall 204 of the truck bed 202 by five piano hinges that are spaced apart along the length of the inner sidewall 204.

In another specific embodiment, the tabletop 102 may be approximately 92.75 inches long and 8.625 inches wide. In some embodiments (i.e., this specific embodiment and others), the tabletop 102 may have a uniform width, without any cutout 114 portion, as long as the width of the tabletop 102 is short enough to pivot from the raised position to the lowered position without coming into contact with the wheel arch 206. Referring again to this specific embodiment, the tabletop 102 may be supported by two 10 inch, 45 pound gas struts that are 42 inches apart. Three hooks 112 may be coupled to an underside of the tabletop 102 and spaced apart along the length of the tabletop 102. Furthermore, the tabletop 102 may be coupled to the inner sidewall 204 of the truck bed 202 by three piano hinges that are spaced apart along the length of the inner sidewall 204.

Although the technology has been described with reference to the embodiments illustrated in the attached drawing figures, equivalents may be employed and substitutions made herein without departing from the scope of the technology as recited in the claims. Furthermore, any dimensions, degrees, and/or numerical ranges provided herein are to be understood as non-limiting examples unless otherwise specified in the claims.

What is claimed is:

1. A fold-out table for a truck bed, comprising:
   a tabletop configured to extend longitudinally along an inner sidewall of the truck bed; and
   one or more hinges disposed below an upper rim of the inner sidewall of the truck bed, the one or more hinges configured to couple the tabletop to the inner sidewall of the truck bed so that the tabletop is pivotable between a raised position and a lowered position, wherein the tabletop is substantially perpendicular to the inner sidewall of the truck bed when the tabletop is in the raised position and substantially parallel to the inner sidewall of the truck bed when the tabletop is in the lowered position,
   wherein the tabletop includes a cutout configured to surround at least a portion of a wheel arch when the tabletop is in the lowered position, wherein the cutout is complementary to a curvature of the wheel arch.

2. The fold-out table of claim 1, wherein the one or more hinges are adjacent to the upper rim of the inner sidewall of the truck bed.

3. The fold-out table of claim 2, wherein the tabletop is configured to be at least partially stowed beneath the upper rim of the inner sidewall of the truck bed when the tabletop is in the lowered position.

4. The fold-out table of claim 1, further comprising:
   one or more retractable support members configured to hold the tabletop in the raised position when the tabletop is pivoted from the lowered position to the raised position.

5. The fold-out table of claim 4, wherein the one or more retractable support members comprise at least two retractable support members coupled to the inner sidewall of the truck bed on opposite sides of the wheel arch.

6. The fold-out table of claim 4, wherein the one or more retractable support members comprise gas struts or gas springs.

7. The fold-out table of claim 1, wherein the tabletop has a non-uniform width along the cutout.

8. The fold-out table of claim 1, further comprising:
   one or more hooks or hangers configured to hold items suspended from the tabletop when the tabletop is in the raised position.

9. A fold-out table system for a truck bed, comprising:
   a first fold-out table configured to extend inwardly from a first side of the truck bed; and
   a second fold-out table configured to extend inwardly from a second side of the truck bed, wherein the second side of the truck bed is opposite the first side of the truck bed, each of the first and second fold-out tables comprising:
   a tabletop configured to extend longitudinally along an inner sidewall of the truck bed; and
   one or more hinges disposed below an upper rim of the inner sidewall of the truck bed, the one or more hinges configured to couple the tabletop to the inner sidewall of the truck bed so that the tabletop is pivotable between a raised position and a lowered position, wherein the tabletop is substantially perpendicular to the inner sidewall of the truck bed when the tabletop is in the raised position and substantially parallel to the inner sidewall of the truck bed when the tabletop is in the lowered position, wherein the tabletop includes a cutout configured to surround at least a portion of a wheel arch when the tabletop is in the lowered position, wherein the cutout is complementary to a curvature of the wheel arch.

10. The fold-out table system of claim 9, wherein the one or more hinges are adjacent to the upper rim of the inner sidewall of the truck bed.

11. The fold-out table system of claim 10, wherein the tabletop is configured to be at least partially stowed beneath the upper rim of the inner sidewall of the truck bed when the tabletop is in the lowered position.

12. The fold-out table system of claim 9, wherein each of the first and second fold-out tables further comprises:

one or more retractable support members configured to hold the tabletop in the raised position when the tabletop is pivoted from the lowered position to the raised position.

13. The fold-out table system of claim 12, wherein the one or more retractable support members comprise at least two retractable support members coupled to the inner sidewall of the truck bed on opposite sides of the wheel arch.

14. The fold-out table system of claim 12, wherein the one or more retractable support members comprise gas struts or gas springs.

15. The fold-out table system of claim 9, wherein the tabletop has a non-uniform width along the cutout.

16. The fold-out table system of claim 9, wherein each of the first and second fold-out tables further comprises:

one or more hooks or hangers configured to hold items suspended from the tabletop when the tabletop is in the raised position.

17. A fold-out table for a truck bed, comprising:

a tabletop configured to extend longitudinally along an inner sidewall of the truck bed; and one or more hinges disposed below an upper rim of the inner sidewall of the truck bed, the one or more hinges configured to couple the tabletop to the inner sidewall of the truck bed so that the tabletop is pivotable between a raised position and a lowered position, wherein the tabletop is substantially perpendicular to the inner sidewall of the truck bed when the tabletop is in the raised position and substantially parallel to the inner sidewall of the truck bed when the tabletop is in the lowered position, wherein the tabletop includes a cutout configured to surround at least a portion of a wheel arch when the tabletop is in the lowered position, wherein the tabletop has a non-uniform width along the cutout.

* * * * *